United States Patent
Adani

(10) Patent No.: US 8,754,274 B2
(45) Date of Patent: Jun. 17, 2014

(54) PROCEDURE FOR THE PRODUCTION OF BIOFUEL FROM ORGANIC WASTES

(75) Inventor: Fabrizio Adani, Milan (IT)

(73) Assignee: Università delgi Studi di Milano, Milan (IT)

(*) Notice: Subject to any disclaimer, the term of this patent is extended or adjusted under 35 U.S.C. 154(b) by 936 days.

(21) Appl. No.: 12/866,977

(22) PCT Filed: Feb. 9, 2009

(86) PCT No.: PCT/IT2009/000042
§ 371 (c)(1),
(2), (4) Date: Sep. 8, 2010

(87) PCT Pub. No.: WO2009/101647
PCT Pub. Date: Aug. 20, 2009

(65) Prior Publication Data
US 2011/0005125 A1    Jan. 13, 2011

(30) Foreign Application Priority Data

Feb. 11, 2008 (IT) .............................. MI2008A0209

(51) Int. Cl.
*C07C 1/00* (2006.01)
(52) U.S. Cl.
USPC ................ 585/14; 585/240; 585/242; 44/605
(58) Field of Classification Search
USPC ................ 585/240, 242, 800, 14; 196/14.52; 44/605
See application file for complete search history.

(56) References Cited

U.S. PATENT DOCUMENTS

| | | | |
|---|---|---|---|
| 3,864,242 A | 2/1975 | Watanabe | |
| 5,714,658 A * | 2/1998 | Heidlas et al. | 585/351 |
| 5,811,607 A * | 9/1998 | Richardt et al. | 585/241 |
| 7,365,236 B2 * | 4/2008 | Catallo | 585/16 |
| 7,612,220 B2 * | 11/2009 | DeLine et al. | 554/11 |
| 7,638,314 B2 * | 12/2009 | Zappi et al. | 435/134 |
| 7,772,414 B1 * | 8/2010 | Hybertson et al. | 554/169 |
| 8,013,195 B2 * | 9/2011 | McCall et al. | 585/240 |
| 2004/0199032 A1 * | 10/2004 | Holmbom et al. | 585/242 |
| 2005/0112735 A1 | 5/2005 | Zappi et al. | |
| 2008/0196299 A1 * | 8/2008 | Anitescu et al. | 44/308 |

FOREIGN PATENT DOCUMENTS

WO    WO 01/46353 A1    6/2001

OTHER PUBLICATIONS

S. Dufreche et al., "Extraction of Lipids from Municipal Wastewater Plant Microorganisms for Production of Biodiesel", Journal of the American Oil Chemists' Society, vol. 84, Jan. 1, 2007, pp. 181-187.
A. Demirbas, "Supercritical Fluid Extraction and Chemicals from Biomass with Supercritical Fluids", Energy Conversion and Management, Elsevier Science Publishers, vol. 42, No. 3, Feb. 1, 2001, pp. 279-294.
Anonymous, "US EPA Method 3541-Automated Soxhlet Extraction," Internet Article, Sep. 1994, pp. 1-3.
A. Demirbas, "Biomass Resource Facilities and Biomass Conversion Processing for Fuels and Chemicals" Energy Conversion and Management, Elsevier Science Publishers, vol. 42, No. 11, Jul. 1, 2001, pp. 1357-1378.

* cited by examiner

*Primary Examiner* — Nina Bhat
(74) *Attorney, Agent, or Firm* — Dickstein Shapiro LLP

(57) ABSTRACT

The present invention concerns a procedure to produce bio-fuels of natural origin from organic wastes. In particular the present invention concerns a procedure to obtain bio-fuels starting from the organic fraction of waste comprising a phase of extraction with a solvent of said organic fraction and a separation of said bio-fuel from said solvent.

16 Claims, 10 Drawing Sheets

PROCEDURE FOR THE PRODUCTION OF BIOFUEL FROM ORGANIC WASTES

The present invention concerns a procedure to produce biodiesel or other bio-fuel of natural origin from organic wastes.

The production of municipal solid waste (MSW) is continuously growing.

The European Union (EU) produces 537 kg/inhabitant per year of wastes that grows up to 580 for West EU-Countries.

Municipal wastes management systems refer mainly to the use of landfills and burning. In Italy it has been recently estimated the use of 5.6% of composting, 10.2% of burning and 48.8% of landfilling.

Landfilling use is decreasing, at least in Europe, and that is due, without any doubts, to the development of separate collection, which for the 2005 was estimated of 25% in Italy. In material recovery, the organic fraction of course plays an fundamental role, as it represents, in weight, an important amount of wastes (>30%). Said amount will increase a lot according to the low performances of separate collection in lots Italian and European regions and according, mainly, to the recent European and national legislative provisions, which, as a matter of facts, will impose the reduction of the quantity of the organic fractions in wastes to be sent to landfills by 65% within 2015 (EU Directive 99/31/CE and D.Lgs 36/2003). What above discussed allows to state that in the future a large amount of organic fraction in wastes from separate collection will be available, which will have to find useful allocation following transformation processes.

The most typical process to treat said fraction is the composting process and only a little part finds use for the production of biogas following anaerobic treatment.

The composting process, apart from being useful within the idea of material recovery, is non favorable from the energetic point of view and requires high investments when related to the added value of the obtainable product (compost), which, as a matter of fact, has a zero value o estimable in few dickers of € /t. Moreover, the treatment-period, i.e. the period that allow to transform the waste into the final product, is long (90 days). In addition, there are the environmental issues (i.e. environmental garrisons for the treatment of gaseous refluents and waters) and the difficult acceptability of this kind of plant by citizens.

Nevertheless, composting is at present the most used process, to which address when lacking alternatives.

New treating solutions the MSW come from the use of the organic fraction of wastes to produce biogas. Said sector is promising and deserving of attention even if, from an economic point of view, is not advantageous. Moreover, some serious plant/technology problems leave to be resolved, in relation to the treatment of only the organic fraction of wastes not mixed with biomass.

Taking into consideration what above discussed, the organic fraction of wastes from separate collection will increase in quantity both in Italy and in Europe and more in general in the world (think of the potentiality of the organic fraction that will be available on the future in Countries like China and India).

About 30 years ago, some authors outlined the use of vegetal oils as substitute of common fossil fuels. Recently, the Office Solid Waste and Emergency Response (OSWER), sponsored initiatives to recover exhausted oils from canteens and similars, to produce biodiesel. Solis-Fuentes et al. (2005), isolated oils and fats from agro-industrial residues for industrial uses. Therefore, there is to note a certain interest in the recovery of oils and fats from secondary materials. As consequence of that, the huge quantity of municipal wastes and in particular of organic fraction of municipal wastes, promises a great development of technologies for the recovery of energy.

The inventor of the present invention ascertained that the organic fraction of the municipal wastes contains a considerable amount of fraction, which is soluble in organic solvent (>15% on a dry matter basis or total solids–ST) with an elevated energetic content (>7.000-8.000 kcal/kg as such, a.s.), which can be usefully recovered as biofuel to be used as it is or after further treatments (e.g. biodiesel production). The isolated fraction looks pasty-oily with a zero water and sulphur content, traces of nitrogen and elevated energetic content. These characteristics are very interesting within the idea of combusting the biofuel obtained in order to produce renewable energy with a minimum impact of the emissions.

The aim of the present invention consists therefore in making available a process for the isolation and use of the fraction having an elevated energetic power contained in the organic waste, which represents, as a matter of fact, a 100%-renewable bio-fuel.

This goal is achieved by the use of an isolation procedure for said fraction from the organic fraction as such, as reported in the annexed claims, whose definitions are integrant part of the present description.

The isolation of the biofuel is obtained according to a chemical-physical process that leads to reduce to a minimum the pre-treatments of waste. Such an aspect is important because the invention has as scope to treat the organic waste without using any pre-treatment, typically expensive and complex, unless for the only preparation of the waste (a slight pre-treatment for the package opening and the optional elimination of present inert materials, e.g. plastic, metals, etc.).

It has been seen that the fraction with high energetic content contained in the waste is soluble in organic solvents but not in water. Therefore, the treatment of the waste as such having elevated water content (TS<25%) with organic solvents, allows to isolate the fraction with high energetic content without any interference from the water contained in the waste itself.

Figure 1:
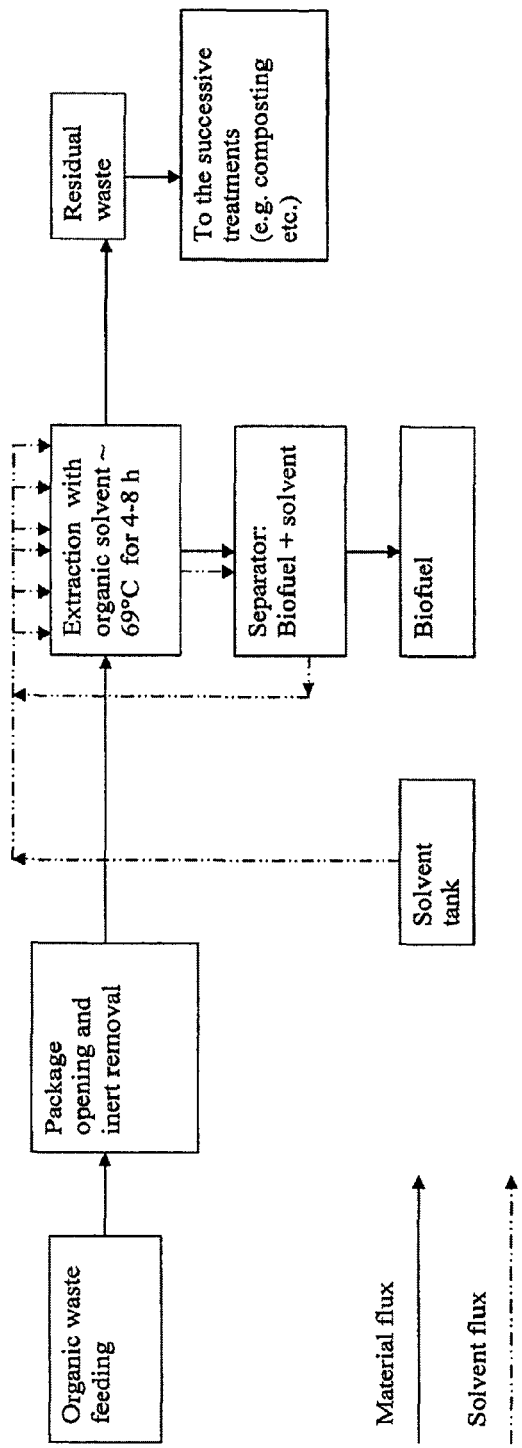
FIG. 1: Block scheme of the procedure used to obtain biofuels with high energetic power from the organic fraction, with apolar organic solvent.

The invention proposes a first system for the isolation of the high energetic power fraction from the wastes, following the solubilization treatment and the physical separation from the organic waste of the bio-fuel fraction by the straction with apolar organic solvent. The treatment scheme is depicted in FIG. 1.

In particular, the organic fraction of the organic waste as such coming form separate collection, after a slight pre-treatment aimed at removing optionally present inert material (plastics, metals etc.), is driven to the extraction phase in a suitable extractor, wherein there is the extraction of the non-polar fraction of the organic waste, preferably with organic solvent (example, hexane) under a continuous percolating flux (percolating method); alternatively, the immersion or mix upstream modalities can be used. The extraction is obtained by making the solvent percolating on the mass and recovering the solvent after the evaporation and successive refrigeration (FIG. 1). The extraction proceeds in batch for 1-10 hours, preferably for 2-8 hours, at the solvent boiling-temperature which, for hexane, preferred as the solvent because it is not corrosive and it is characterized by limited toxicity, is about 69° C. at 1013 hPa. Other solvents can be usefully used as well, such as: pentane, heptanes, octane, carbon sulfur, gasoline solvent, trichloroethylene, paraffinic solvents. The extraction should be made at the boiling temperature of the solvent used, preferably.

It has also been seen that the same organic fraction is soluble in fluid supercritical $CO_2$ (S—$CO_2$). A supercritical fluid is obtained under particular temperature vs pression condition (Kuo and Gardner, 2002), in order to acquire solvent property similar to that of the organic solvents. Under supercritical condition the $CO_2$ is neither a gas nor a liquid. Under these condition the $CO_2$ acquires solvent properties of apolar molecules, similar to those of the apolar organic solvents. A great advantage in the use of supercritical $CO_2$ is that it is completely innocuous, not flammable and not explosive, low costly and it is easy to be removed from the final extracted product.

The solubility of solute in S—$CO_2$ depends on the temperature and pressure conditions adopted; by changing these conditions both the solvent properties and the extraction yields can be changed.

The use of supercritical $CO_2$, used under correct conditions, allows to obtain, from the organic fraction of the wastes as such, a biofuel having a high energetic content, absence of water and sulphur and traces of nitrogen.

Figure 2:
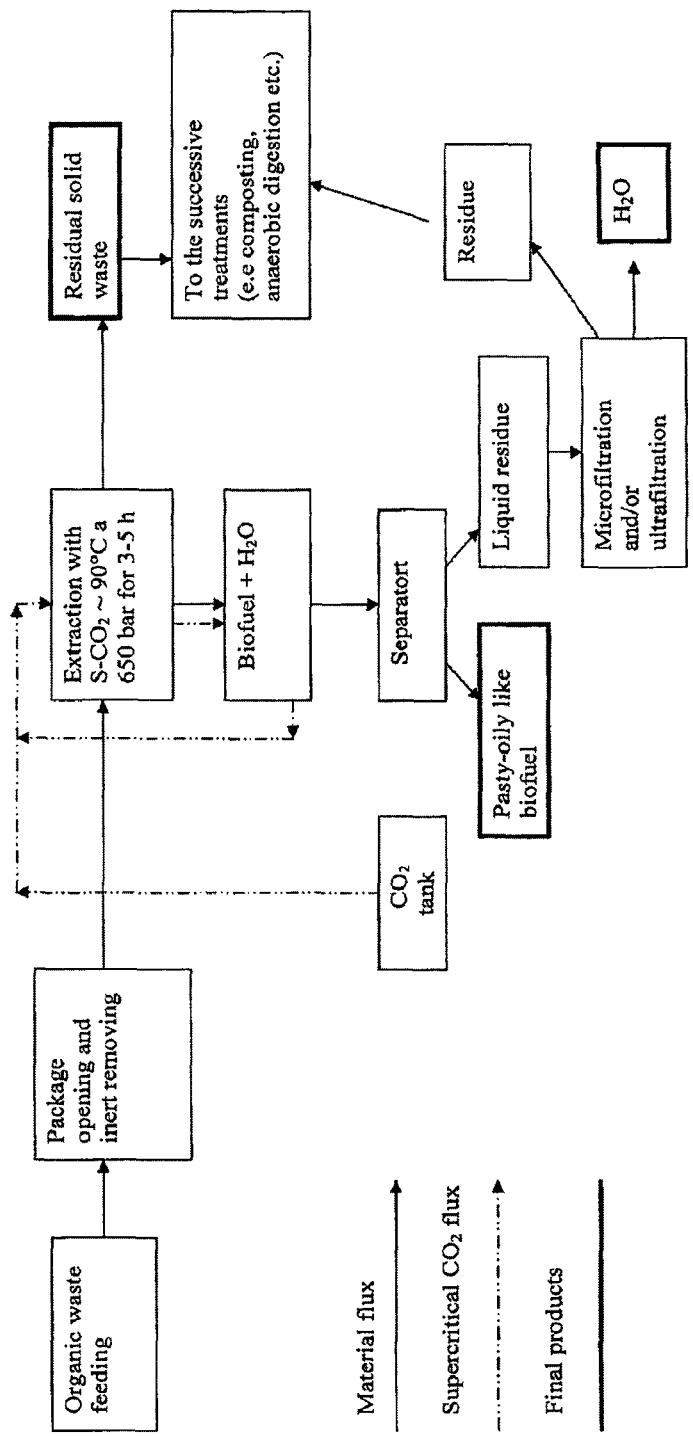
FIG. 2: Block scheme of the procedure used to obtain biofuels with high energetic power by using supercritical $CO_2$.
Figure 6:
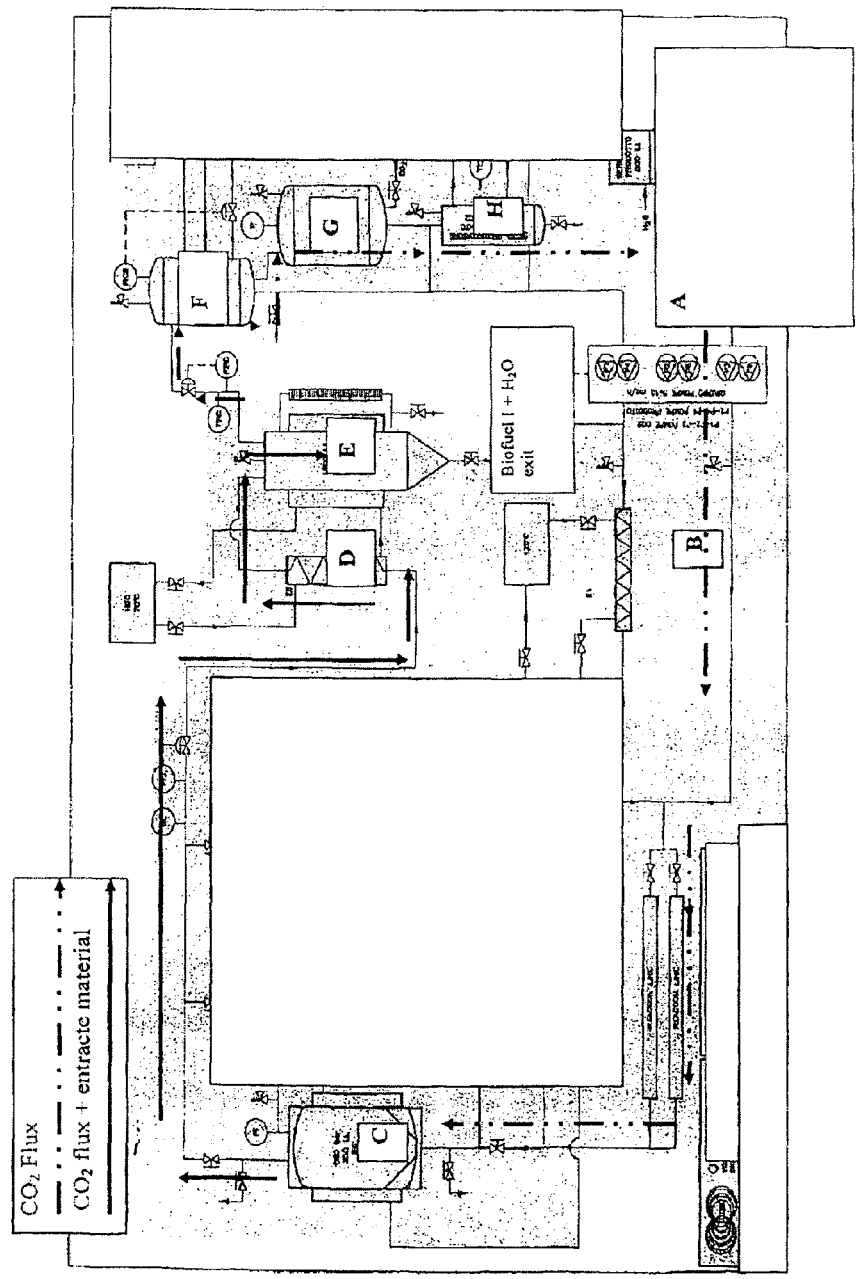
FIG. 6: Pilot Plant scheme used for the extraction with supercritical $CO_2$ of the combustible fractions from the organic fraction of wastes.

The organic fraction of the wastes as such coming from separate collection, after a slight pre-treatment used to remove the optionally present inert materials (plastics/metals etc.), is send to an extractor in which there is performed the extraction with supercritical $CO_2$ (S—$CO_2$) under a continuous $CO_2$ flux with recovery of $CO_2$ (FIG. 2 and FIG. 6). There is used an extraction ratio of 1 kg of mass as such/20-60 L $CO_2$, preferably 1 kg/35 L $CO_2$, and a flux rate of 5-20 m$^3$/h, preferably of 15 m$^3$/h. The extraction proceeds in batch for about 2-8 hours, preferably 3-5 hours. The pressure adopted is 200-900 bars, preferably about 650 bars and T of 40-90° C., preferably of about 90° C. The $CO_2$ flux extracted is then sent to a separator, wherein the "precipitate" and the recovered $CO_2$ is reused for the extractions.

The obtained biofuel will be able to be used as such or undergone successive treatment (for instance, to produce biodiesel).

The aqueous fraction extracted from S—$CO_2$ extraction, after separation from the biofuel in the separator (FIG. 2), is micro-o ultra-filtrated, to recover the suspended fraction that could be eliminated successively.

It has been seen that the supercritical $CO_2$ at the adopted condition, may solubilize not only the apolar fraction, but it is also able to separate from the waste part of the water contained. What observed allows to obtain a second biofuel, which is the residual waste from the supercritical $CO_2$ treatment, which is hygienic, partially dried and has an interesting energetic content (energetic content >3500 kcal/kg as such). To such fraction there can be added the fraction obtained from the micro- or ultrafiltration of the aqueous residue that has an energetic content >3.500 kcal/kg as such (FIG. 3).

Figure 3:
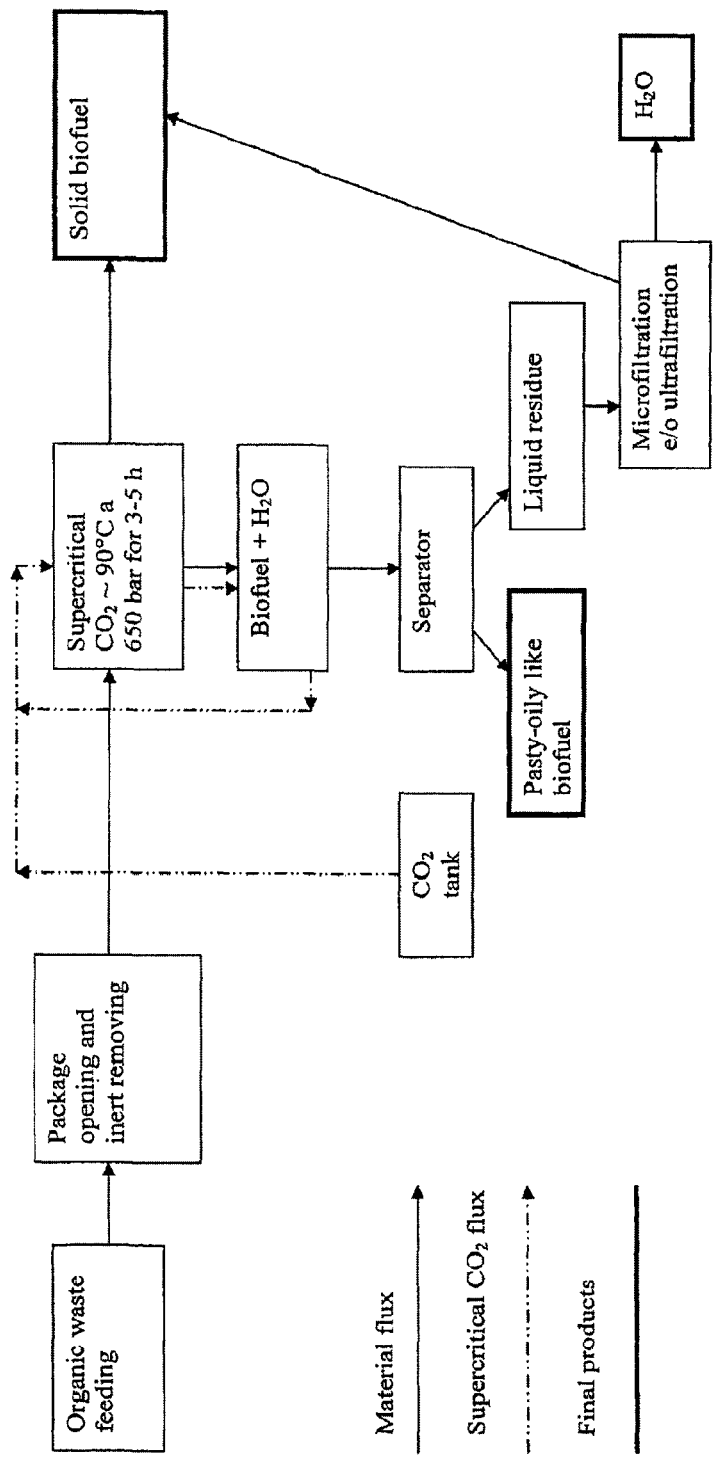
FIG. 3: Block scheme of the integrated system management of the organic fraction of wastes from separate collection to produce high energetic power biofuels by using supercritical $CO_2$.

Therefore, the S—$CO_2$ treatment is proposed as a true integrated system for treating the organic fraction of the wastes from separate collection, according to a treatment scheme reported in FIG. 3, whose result is the production of two different types of biofuels and the absence of the production of wastes/residues. The great advantage of the treatment of the organic fraction of the wastes by the treatment described consists in the reduced treatment times.

EXPERIMENTAL PART

Extraction Procedure with Organic Solvent:Hexane

Plant Used

The treatment of the organic fraction of the municipal wastes has been performed in laboratory with the aid of a Soxhlet extractor apparatus working under continuous conditions.

Procedure Used to Produce Renewable Biofuels

About 3-5 g of the organic fraction of 4 municipal wastes as such [Total solids (TS) of 27±1.8%, volatile solids (VS) of 93±3.7%, pH of 4.7±0.07] from separate collection sampled from private municipal users have been loaded in cellulose thimbles of 100 mL, after a size reduction to <1 cm. The extraction proceeded then by using Soxhlet apparatus using hexane as the extraction solvent (95% v/v). The extraction of the soluble fraction has been performed for variable times of 2-8 hours by adopting continuous extraction at a temperature of 69° C. thanks to the presence of a reflux which allows the hexane cooling flow and its condensation and to heaters which allow its continuous evaporation.

Figure 4:
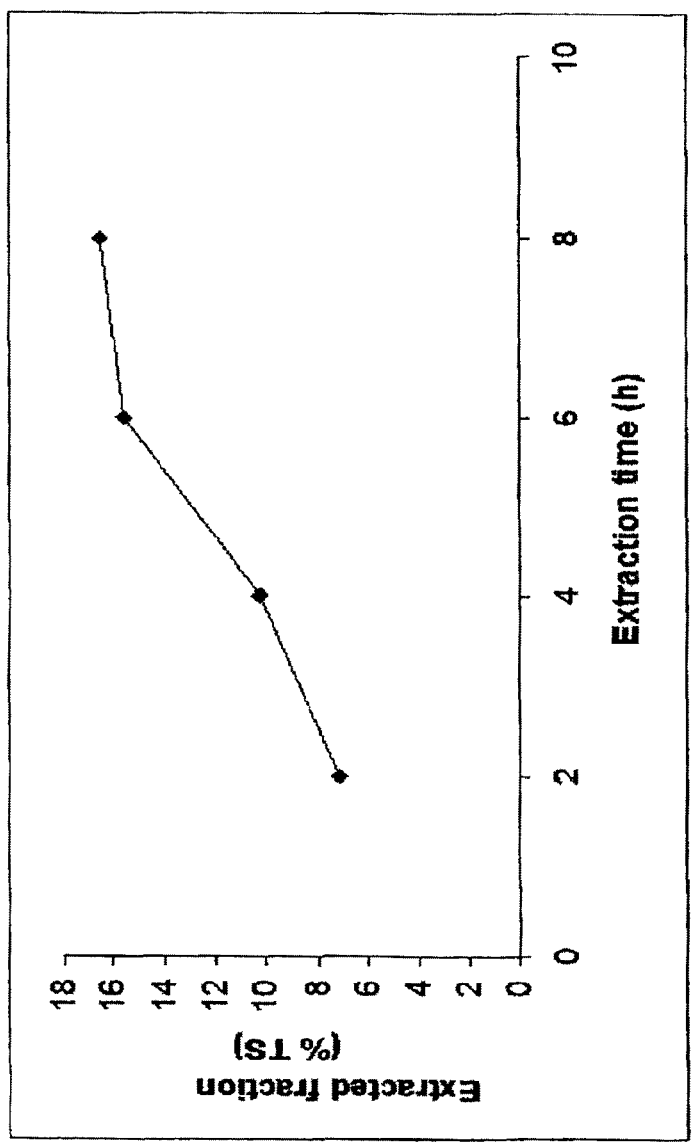
FIG. 4. Example of the extraction versus time of the hexane-soluble fraction.

The optimal extraction time to get the maximum extraction yield resulted 8 hours for all the tested samples (FIG. 4).

The analytical data below reported, refer to the characteristics of the biofuel obtained after such a an extraction time.

From the extraction procedure two fluxes are obtained: i) biofuel+solvent, that is recovered in a suitable container and ii) residual waste in the cellulose thimbles. The biofuel is then isolated by separating the hexane by the aid of a rotavapor. The residual waste was stored and partly dried for the successive analyses.

Characteristics of the Isolated Biofuel

The biofuel fraction I, named Biofuels from Organic Waste (BiOW), presents as pasty-oily like with absence of water and sulphur and traces of nitrogen and it is characterized by a very high energetic content. Some chemical characteristics of the biofuel I are reported in Table 1.

TABLE 1 chemical characterization of BiOW from the organic fraction
of municipal wastes extracted by using hexane.

| Yield % w.w. | Yield % TS | Total solids | pH | Energ. content kJ/kg a.s. | C | H | N % TS | S | O |
|---|---|---|---|---|---|---|---|---|---|
| 5.3 ± 2 | 19 ± 9.5 | 100% | 4.1 | 31.225 ± 1181 | 73.6 ± 3 | 11.3 ± 0.6 | 0.34 ± | — | 14.7 ± 3.4 | a.s. = as such;
TS = total solid

Figure 5:
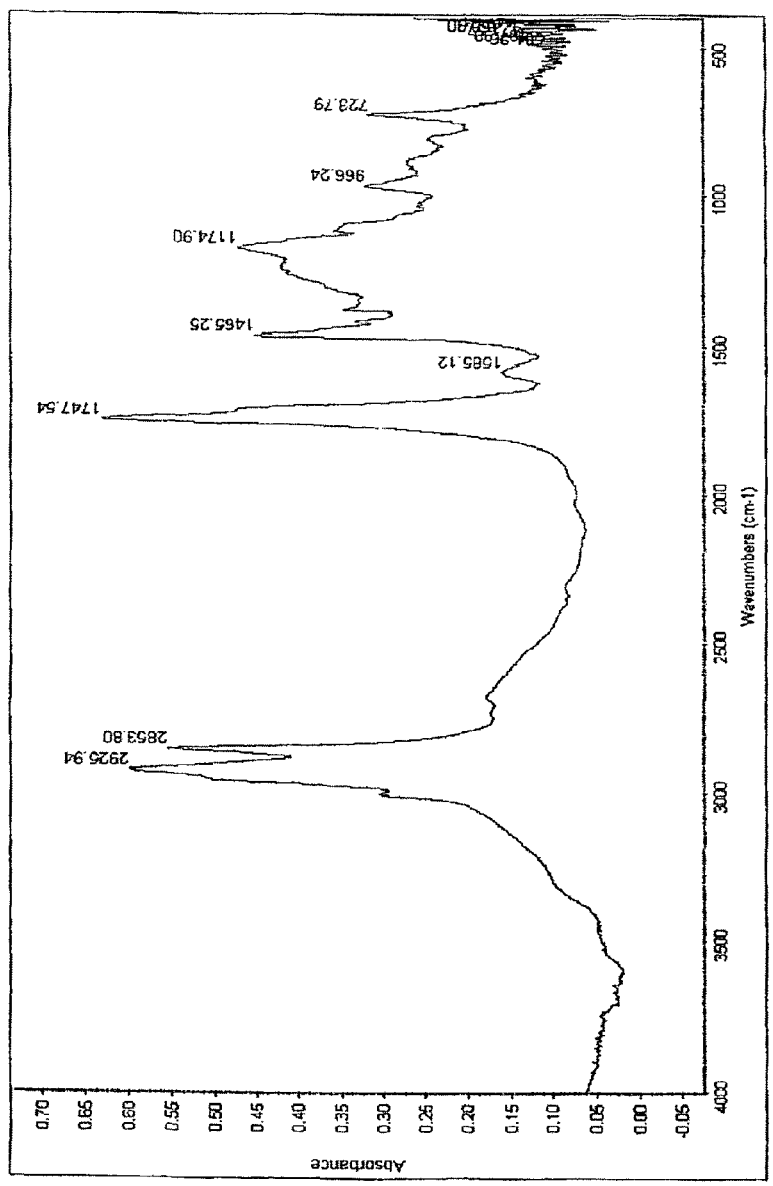
FIG. 5: DRIFT Spectra of the high energetic power fraction (BiOW) extracted from the municipal waste with hexane after 8 h.

From a qualitative point of view the BiOW results composed by lipids and aromatic molecules (FIG. 5).

Process with Supercritical $CO_2$

Pilot Plant Used

The treatment of the organic fraction of the municipal wastes has been performed by using a pilot plant as shown in FIG. 6 and wherein:

A: liquid $CO_2$ tank;
B: heat exchanger (90° C.);
C: extractor of 10 L capacity (650 bar);
D: heat exchanger (35° C.);
E: separator;
F: condensator (45 bar, 20° C.);
G: lung container (45 bar, 20° C.);
H: refrigerator (80 bars, 10° C.)

Each single part that composes such pilot plant is conventional and therefore will not be described more in detail.

Procedure Used to Produce Renewable Biofuels.

About 2-3 kg of organic fraction of 2 different municipal wastes ([Total solids (TS) of 28±1.4%, volatile solids (VS) of 94%±1.7, pH of 4.6±0.08]) from separate collection sampled from private municipal users have been loaded as such into the extractor C (FIG. 6). The extraction proceeded then by using supercritical $CO_2$ at 650 bar and 90° C. (the $CO_2$ was heated at 90° C. by using heat exchanger B) for variable periods of 5 h, adopting an extraction ratio of 1 kg of organic fraction as such/35 L $CO_2$ and a flux rate of 15 m³/h.

From the extractor C, two fluxes of material have been obtained: i) biofuel I+$H_2O$, collected in a suitable downstream and ii) biofuels II residual from the extractor C.

The biofuel I, water immiscible, has then been separed from the same by simple transfer of the liquid fraction into another container the successive recovery of the biofuel fraction and filtration of the residual liquid.

The biofuel II has been instead simply collected and stored.

The three fluxes of material, i.e. biofuel I, biofuel II and residual water, have then undergone the chemical-physical analysis of the case.

Mass Balance and Yields

Figure 7:
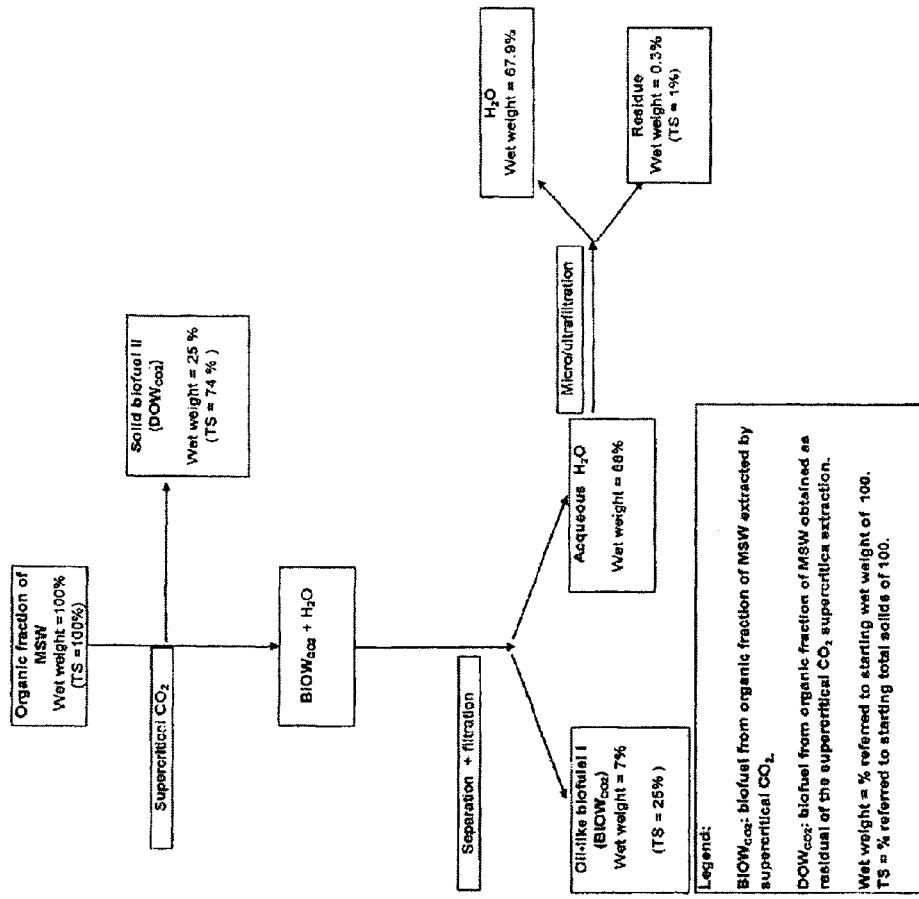
FIG. 7: Mass balance for biofuel relating to the extraction of the biofuels from organic wastes with supercritical $CO_2$.

The complete mass balance of many extraction procedures performed is reported in FIG. 7.

As before précised, 3 fluxes of material have been obtained:

biofuel I of pasty-oily like consistency;
biofuel I of solid consistency;
aqueous solution.

Biofuel I ($BiOW_{CO2}$)

The fraction biofuel I, named Biofuel from Organic Waste ($BiOW_{CO2}$) is pasty-oily with absence of water and presents traces of nitrogen, has an elevated energetic content and is completely hygienic and sterilized by virtue of the elevated pressures and temperatures to which the waste is subjected during the extraction process. Some of the chemical characteristics of the biofuel I are presented in Table 2.

TABLE 2 example of biofuel I ($BiOW_{CO2}$) obtained from the organic fraction
of municipal solid waste by supercritical $CO_2$ extraction.

| Yield % w.w. | Yield % TS | TS | pH | Energ. content kJ/kg a.s. | C | H | N % TS | S | O |
|---|---|---|---|---|---|---|---|---|---|
| 7 | 25 | 100 | 4.03 | 31.000 ± 2540 | 67 ± 2 | 10.25 ± 1.2 | 0.11-0.12 | 0 | 22.44 | a.s. = as such;
TS = total solids

Figure 8:
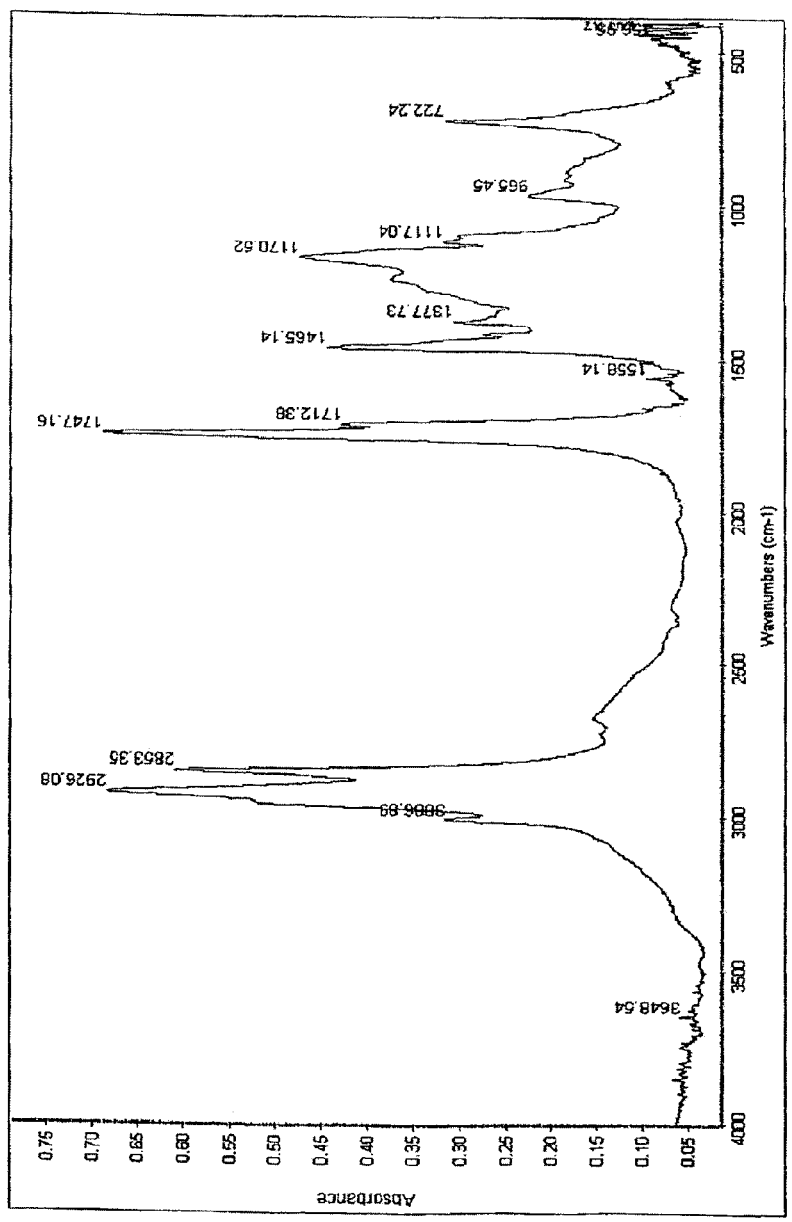
FIG. 8: DRIFT Spectra of the high energetic content fraction (BiOW) extracted from the municipal waste with supercritical $CO_2$.

From a qualitative point of view, the $BiOW_{CO2}$ results to be composed of lipids and aromatic molecules (FIG. 8).

Biofuel II ($DOW_{CO2}$)

The biofuel II fraction, named $CO_2$-Dried Organic Waste ($DOW_{CO2}$), presents as a solid, with a limited water content, following the drying effect operated by the $CO_2$ during extraction process, has a medium energetic content and is completely hygienic and sterilized by virtue of the elevated pressures and temperatures to which the waste is subjected during the extraction process. Some of the chemical characteristics of biofuel II are reported in Table 3.

TABLE 3 example of characterization of $DOW_{CO2}$ from
the organic fraction of municipal wastes with
supercritical $CO_2$.

| TS % a.s. | Energetic content kJ/kg a.s. |
|---|---|
| 79.2 ± 4.3 | 15.582 ± 1.315 | a.s. = as such;
TS = total solids

Figure 9:
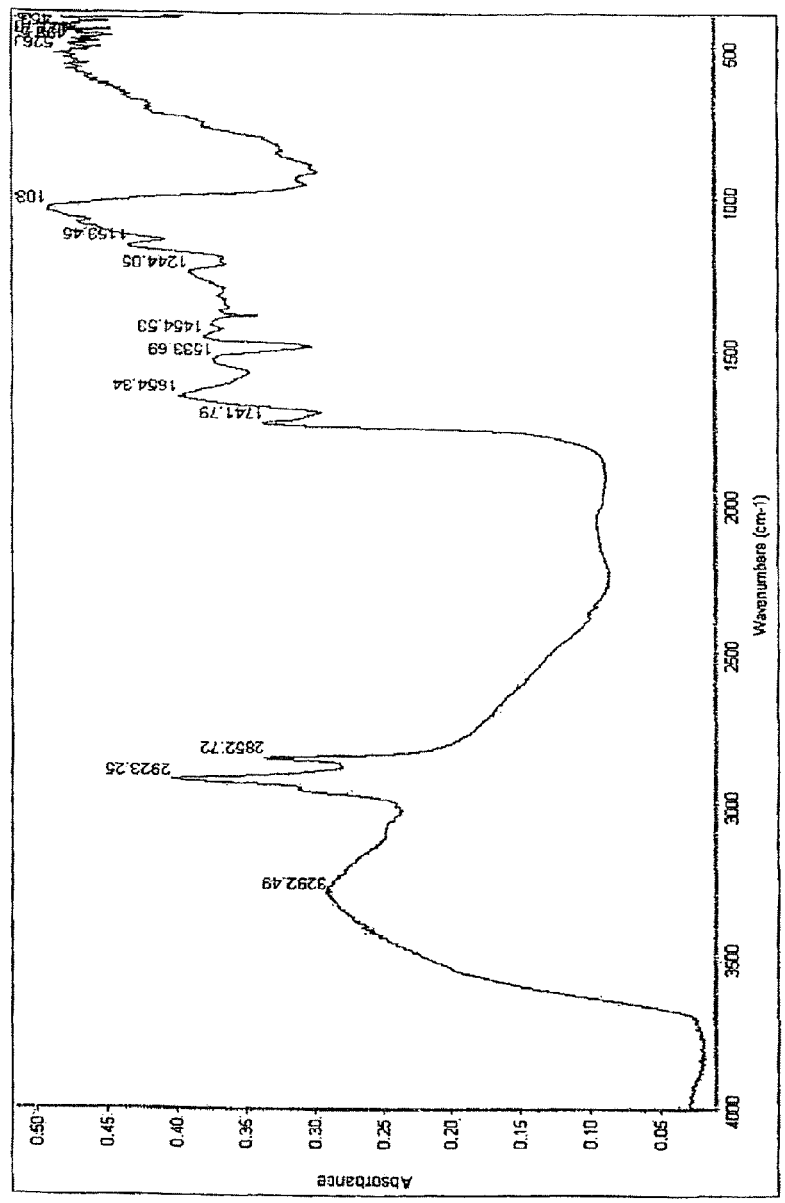
FIG. 9: DRIFT Spectra of the solid residual fraction (DOWCO$_2$) from the extraction with supercritical $CO_2$.

From a qualitative point of view the $DOW_{CO2}$ results composed of heterogeneous molecules (FIG. 9).

Residual Aqueous Solution

Figure 10:
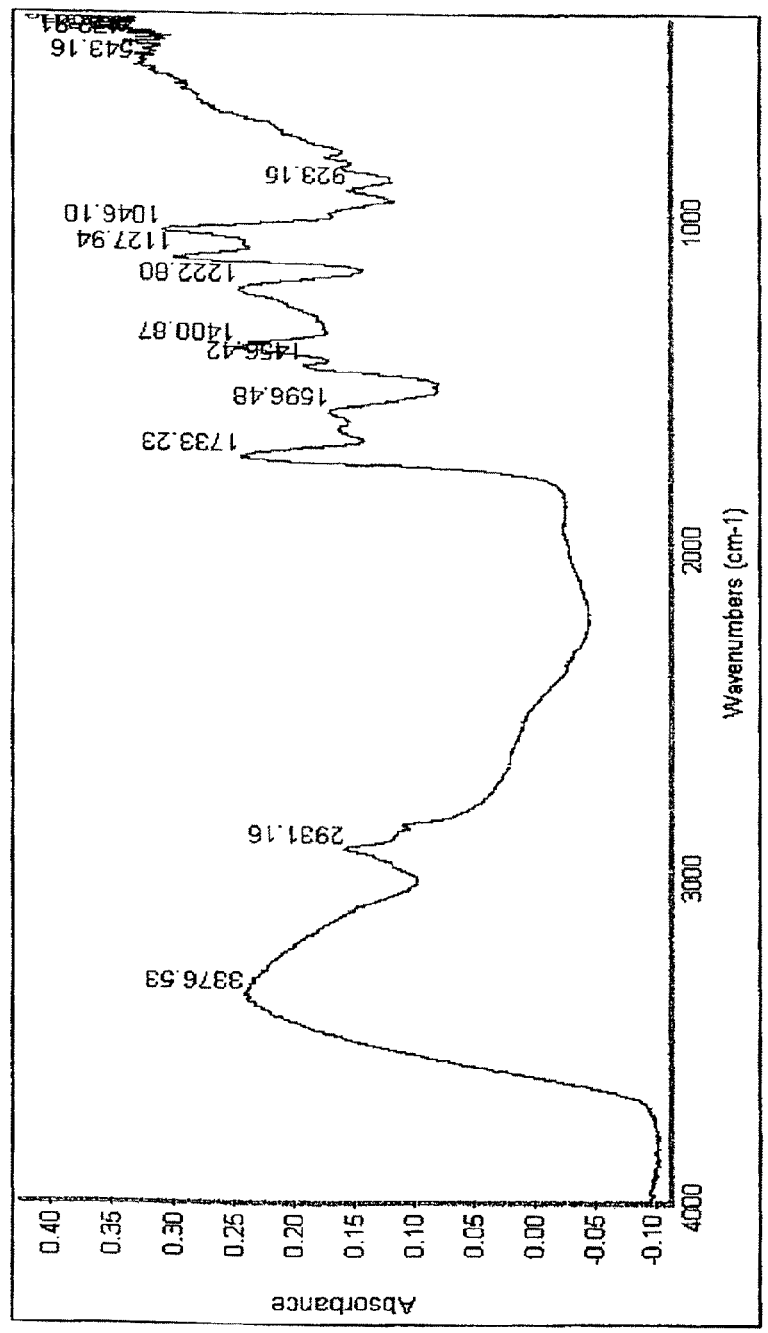
FIG. 10: DRIFT spectra of the solid fraction present in the aqueous suspension.

From the extractor and after the $BiOW_{CO2}$ separation, there resulted a water suspension with by an acid (pH=3.22) and low dry residual content (<0.7% as such) with COD=35.631 mg/L and BOD of 4.500 mg/L. From a qualitative point of view, the fraction in aqueous suspension resulted composed of heterogeneous molecules (FIG. 10).

From the above, there resulted evident the advantages of the procedure of the present invention.

In fact, it allows to obtain at a competitive cost a biofuel product from organic wastes, under elevated hygienical conditions.

At the same time, the use of supercritical $CO_2$ allows to obtain a solid residue having an elevated content of dry substance and in elevated sterility conditions, which represents a biofuel derived from wastes of high quality and 100%-renewable.

BIBLIOGRAPHY

APAT, 2007. Rapporto Rifiuti 2006 APAT-ONR.
EPA. 2005. OSWER Innovation Pilot: urban waste to biodiesel Initiative. Solid waste and Emergency Response (5101T).
King J. W. 2002. Supercritical fluid technology for lipid extraction, fractionation and reaction. In: Kuo T. M., Gardner H. W. (Eds). Lipid Biotechnology, Marcel Dekker, New York, pp. 663-687.
Leithner W. 2000. Designed to dissolve. Nature 405, 129-130.
Wang L., Weller C. L., Schlegel V. l., Carr T. P., C S. L. 2007. Comparison of supercritical $CO_2$ and hexane extraction of lipids from sorghum distillers grains. Eur. J. Lipid Sci. Technol. 109, 567-574.

The invention claimed is:

1. A method of producing biofuel from the organic fraction of municipal wastes, comprising:
   i) an extraction phase with a solvent substance of that organic fraction;
   ii) the separation of a first biofuel from said solvent substance;
   iii) obtaining a second biofuel, which is the residual waste from the extraction phase, which is hygienic, partially dried and has an energetic content greater than 15 kJ/kg; and
   iv) micro- or ultra-filtration of an aqueous fraction extracted after the separation of said first biofuel, to recover the suspended fraction and to give a biofuel solid fraction having an energetic content higher than 15 kJ/kg.

2. The method according to claim 1, wherein said organic fraction has a solid material content below 25% by weight.

3. The method according to claim 1, wherein said extraction phase is performed by continuous extraction.

4. The method according to claim 1, wherein said solvent substance is an apolar organic solvent.

5. The method according to claim 4, wherein said apolar organic solvent is selected from the group consisting of pentane, heptanes, octane, gasoline solvent, trichloroethylene, carbon sulfur and paraffinic solvents or their mixtures.

6. The method according to claim 4, wherein said extraction phase is performed for 1-10 hours, preferably at the boiling temperature of the solvent.

7. The method according to claim 4, wherein said extraction phase is performed at a temperature comprised between room temperature and the boiling temperature of the solvent.

8. The method according to claim 1, wherein the solvent substance is $CO_2$ in supercritical phase.

9. The method according to claim 8, wherein said extraction phase is performed with an extraction ratio of 1 kg mass as such/20-60 L supercritical $CO_2$ and a flux rate of 5-20 $m^3/h$.

10. The method according to claim 9, wherein the extraction phase is performed with an extraction ratio of 1 kg/35 L supercritical $CO_2$ and a flux rate of 15 $m^3/h$.

11. The method according to claim 8, wherein said extraction phase is performed for 2-8 hours.

12. The method according to claim 8, wherein said extraction phase is performed at the pressure of 200-900 bars, and T of 40-90° C.

13. The method according to claim 8, wherein said procedure includes a separation phase from said biofuel obtained of a liquid phase and successive micro- or ultrafiltration of said liquid phase, with the recovery of a second biofuel solid fraction and low energetic content.

14. The method according to claim 13, further comprising a mixing phase of said suspended fraction with said second biofuel, which is the solid residue from the extraction phase, to give a biofuel with energetic content higher than 15 kJ/kg.

15. The method according to claim 1, wherein said organic fraction is previously deprived of inert material such as metals, plastics or similar.

16. A biofuel obtainable with the procedure according to the method of claim 1, said biofuel being without sulphur and having an energetic content higher than 7.000 kcal/kg.

* * * * *

UNITED STATES PATENT AND TRADEMARK OFFICE
CERTIFICATE OF CORRECTION

PATENT NO.        : 8,754,274 B2
APPLICATION NO.   : 12/866977
DATED             : June 17, 2014
INVENTOR(S)       : Fabrizio Adani It is certified that error appears in the above-identified patent and that said Letters Patent is hereby corrected as shown below:

On the title page, Item (73), Assignee, change "Università delgi Studi di Milano" to
-- Università degli Studi di Milano --

Signed and Sealed this
Twenty-first Day of July, 2015

Michelle K. Lee
*Director of the United States Patent and Trademark Office*